United States Patent
Lin

(10) Patent No.: US 7,600,469 B2
(45) Date of Patent: *Oct. 13, 2009

(54) BARBECUE DEVICE

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 574 days.

This patent is subject to a terminal disclaimer.

(21) Appl. No.: 11/058,360

(22) Filed: Feb. 15, 2005

(65) Prior Publication Data

US 2006/0180138 A1   Aug. 17, 2006

(51) Int. Cl.
*A47J 37/00* (2006.01)

(52) U.S. Cl. .............................. 99/349; 99/353; 99/372; 99/375; 99/378; 99/379; 99/400; 99/425; 99/446

(58) Field of Classification Search .................. 99/339, 99/340, 349–351, 337, 352–355, 403–417, 99/372–384, 422–425, 444–450, 327–332, 99/389–391, 400, 401; 219/494, 496, 441, 219/442, 544, 468.2, 521–525

See application file for complete search history.

(56) References Cited

U.S. PATENT DOCUMENTS

| 3,146,692 | A  | * | 9/1964 | Connolly et al. | ............... | 99/379 |
| 6,363,835 | B1 | * | 4/2002 | Wu | .............................. | 99/331 |
| 6,439,108 | B1 | * | 8/2002 | Wu | .............................. | 99/349 |
| 6,595,116 | B1 | * | 7/2003 | Lin | .............................. | 99/349 |
| 6,782,804 | B1 | * | 8/2004 | Lin | .............................. | 99/349 |
| 7,109,442 | B2 | * | 9/2006 | Steinberg et al. | ............ | 219/386 |

* cited by examiner

*Primary Examiner*—Timothy F. Simone
(74) *Attorney, Agent, or Firm*—Alan Kamrath; Kamrath & Associates PA

(57) ABSTRACT

A barbecue device includes two cooking plates. The first cooking plate has two hinge joints at both rear ends, with each joint including an elliptical cavity, a shoulder on its inner wall, and a rib projected from the inner wall. The second pivotal cooking plate has two arc rabbets corresponding to the hinge joint, with each arc rabbet adapted to fit onto the joint and slide thereon. An inverted U-shaped handle is pivotally secured to the first cooking plate and has two rotation portions at both ends. Each rotation portion includes a projecting pin inserted into the elliptical cavity, disposed at one end of the elliptical cavity, and being lengthwise slidable therein, and a projecting stop member being parallel to the pin. The hinge is adapted to adjust an angle between the cooking plates in response to different thickness of foodstuffs or the number of foodstuffs to be broiled.

1 Claim, 5 Drawing Sheets

US 7,600,469 B2

BARBECUE DEVICE

BACKGROUND OF THE INVENTION

1. Field of Invention

The present invention relates to cooking appliances and more particularly to a barbecue having an improved hinge mechanism for adjusting an angle between two cooking plates thereof in response to the different thickness of foodstuffs or the number of foodstuffs to be broiled.

2. Related Art

Conventionally, a barbecue is held in an open area (e.g., park) where meat is broiled on a grill over a charcoal fire. Ashes may be left at the place after barbecuing. This is not desirable. Recently, a barbecue capable of being easily assembled is available. Such barbecues are particularly suitable for the garden. While it is advantageous for keeping the environment clean, it is also disadvantageous for being unstable after assembly. More recently, many improvements (e.g., temperature setting, grease collecting cups, etc.) are found in commercially available barbecues. Thus, continuing improvements in the development of barbecues are constantly being sought in order to contribute significantly to the advancement of the art.

SUMMARY OF THE INVENTION

It is therefore an object of the present invention to provide a barbecue device with an improved hinge mechanism adapted to adjust an angle between two cooking plates of the barbecue in response to different thickness of foodstuffs or the number of foodstuffs to be broiled.

The above and other objects of the present invention are realized by providing a barbecue comprising first and second cooking plates. The first cooking plate comprises two hinge joints at both ends of a rear side. Each hinge joint is of a hollow cylinder and includes an elliptical cavity and a shoulder on its inner wall. A rib projects from the inner wall toward its center. The second pivotal cooking plate comprises two arc rabbets corresponding to the hinge joint. Each arc rabbet is adapted to fit onto an outer surface of the hinge joint of the first cooking plate and slide thereon. A substantially inverted U-shaped handle is pivotally secured to the first cooking plate and comprises two rotation portions. Each rotation portion is provided on an open end of either side of the handle and has a projecting pin inserted into the cavity and lengthwise slidable therein and has a projecting stop member being parallel to the projecting pin. For broiling thin foodstuffs, the handle is adapted to clockwise pivot with respect to the first cooking plate from a closed position of the barbecue to a first open position thereof until the stop member is stopped by the shoulder. For broiling thick foodstuffs, the handle is adapted to counterclockwise pivot with respect to the first cooking plate from the first open position of the barbecue to the closed position thereof. In addition, for broiling a plurality of thin foodstuffs, the handle is adapted to lift from the first open position of the barbecue until the pin is disposed at the other end of the cavity and the stop member clears the shoulder temporarily, and the second cooking plate is adapted to pivot further in a clockwise direction with respect to the first cooking plate, until the second cooking plate is substantially flush with the first cooking plate, with the pin disposed at one end of the cavity and the stop member stopped by the rib.

The above and other objects, features and advantages of the present invention will become apparent from the following detailed description taken with the accompanying drawings.

DETAILED DESCRIPTION OF THE INVENTION

Figure 1:
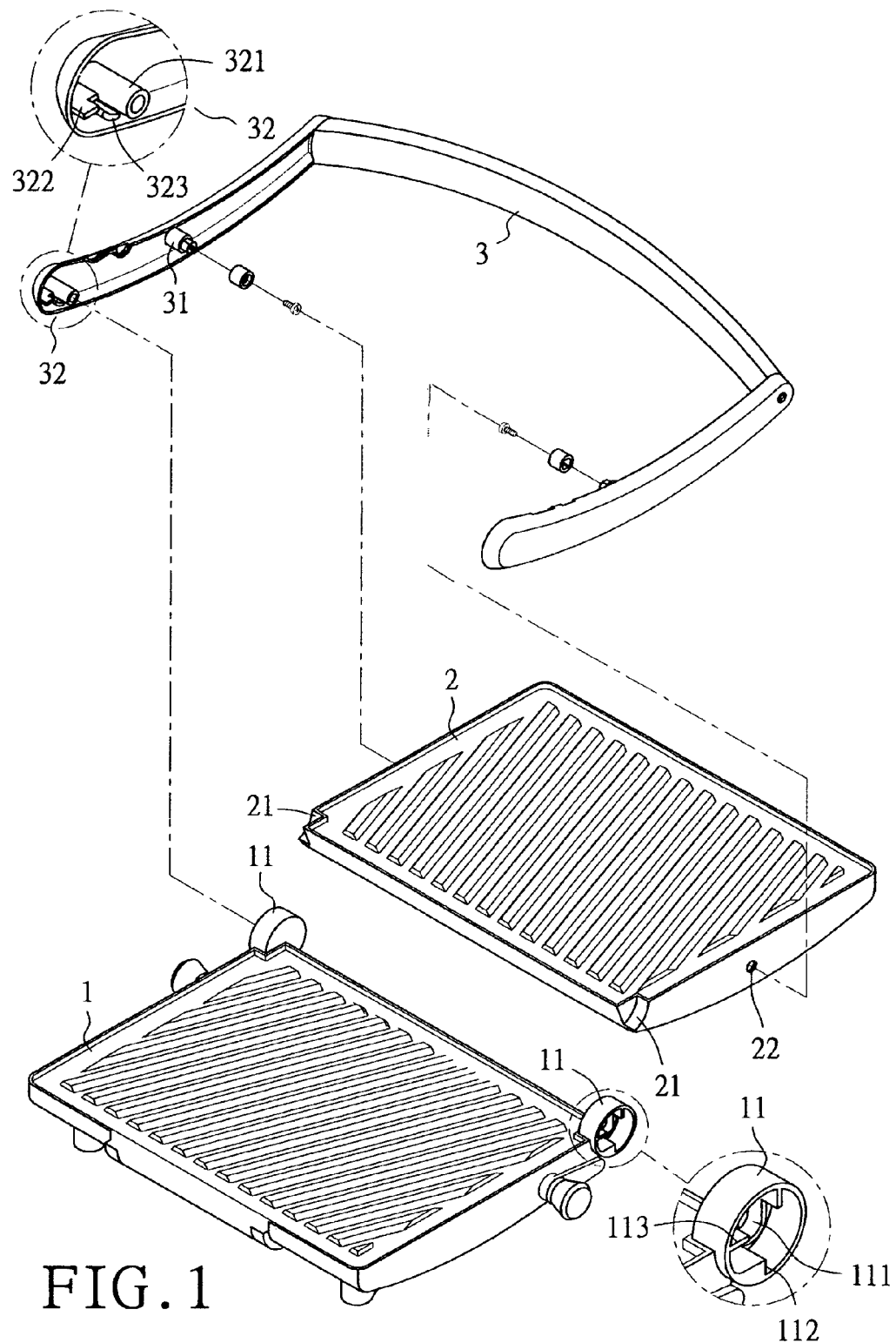
FIG. 1 is an exploded view of a preferred embodiment of a barbecue according to the invention.
Figure 2:
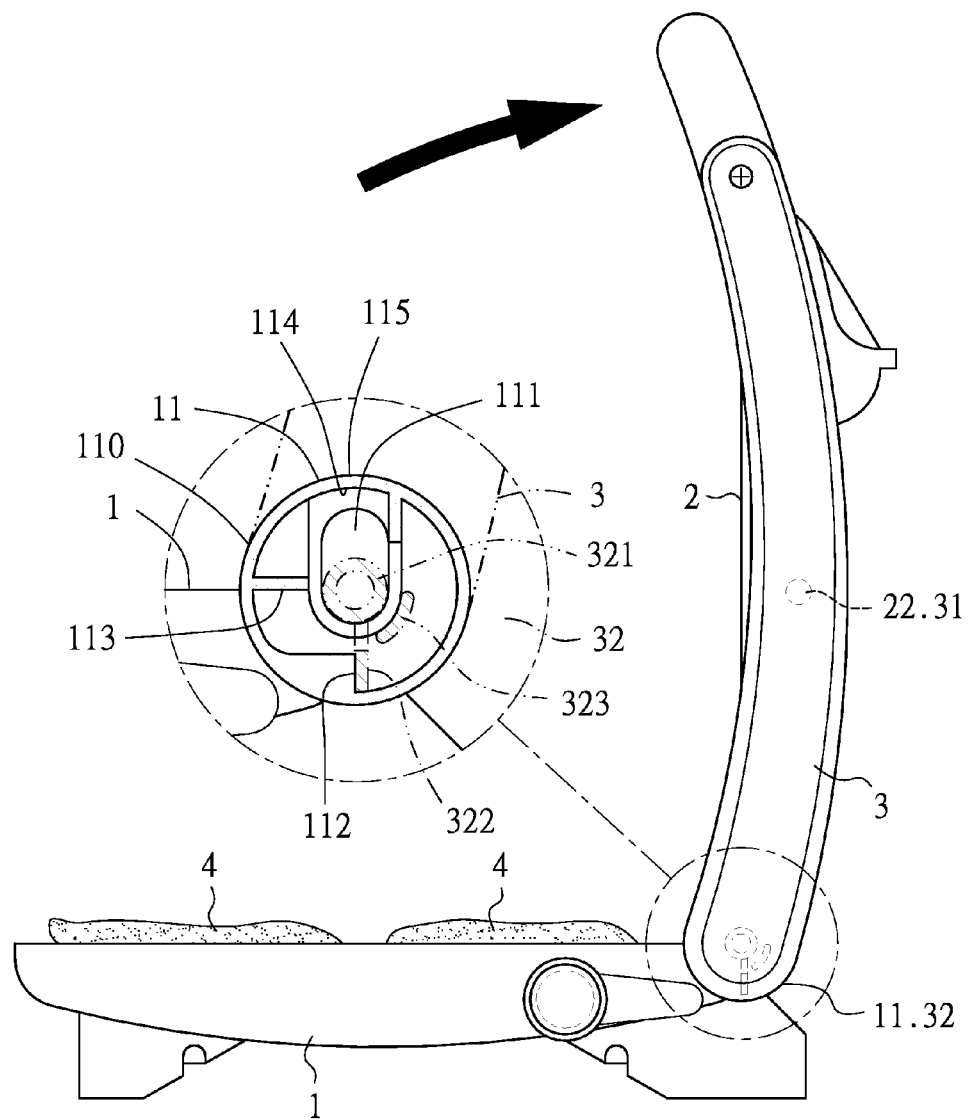
FIG. 2 is a side view of the assembled barbecue with thin foodstuffs being broiled thereon in an open position thereof according to one embodiment of the invention.

Referring to FIGS. 1 and 2, there is shown a barbecue constructed in accordance with the invention. The barbecue comprises two rectangular cooking plates 1 and 2, and an inverted U-shaped handle 3. The first cooking plate 1 is fixedly formed on a base and comprises two hinge joints 11 at both ends of a rear side. Each hinge joint 11 is made of a hollow cylinder 110 and comprises an elliptical cavity 111, a shoulder 112 on an inner wall 114 of the hinge joint 11, and a rib 113 projected from the inner wall 114 of the hinge joint 11 toward a center thereof. The second pivotal cooking plate 2 comprises two arc rabbets 21 corresponding to the hinge joint 11 of the first plate 1 and two holes 22 each at about a middle portion of either side of the cooking plate 2. The arc rabbets 21 are adapted to fit onto an outer surface 115 of the hinge joint 11 and slide thereon. The handle 3 comprises two pins 31 each at about a middle portion of an inner surface of the handle 3 at either side. The pins 31 are inserted into the holes 22 so that the handle 3 and the second cooking plate 2 are pivotally coupled together. The handle 3 further comprises two rotation portions 32 each at an open end of each side. The rotation portion 32 comprises a projecting pin 321 inserted into the cavity 111 and being lengthwise slidable therein (i.e., a hinge mechanism is formed), a projecting stop member 322 being parallel to the pin 321, and a projecting arcuate member 323 spaced from the pin 321.

Referring to FIG. 2 again, for broiling thin foodstuffs 4, the handle 3 is pulled upwardly at about 90 degrees with respect to the first cooking plate 1 from a closed position of the barbecue to an open position thereof as indicated by an arrow. After that, the second cooking plate 2 is substantially perpendicular to the first cooking plate 1. At this position, the stop member 322 is stopped by the shoulder 112, and the barbecue is thus stable.

Figure 3:
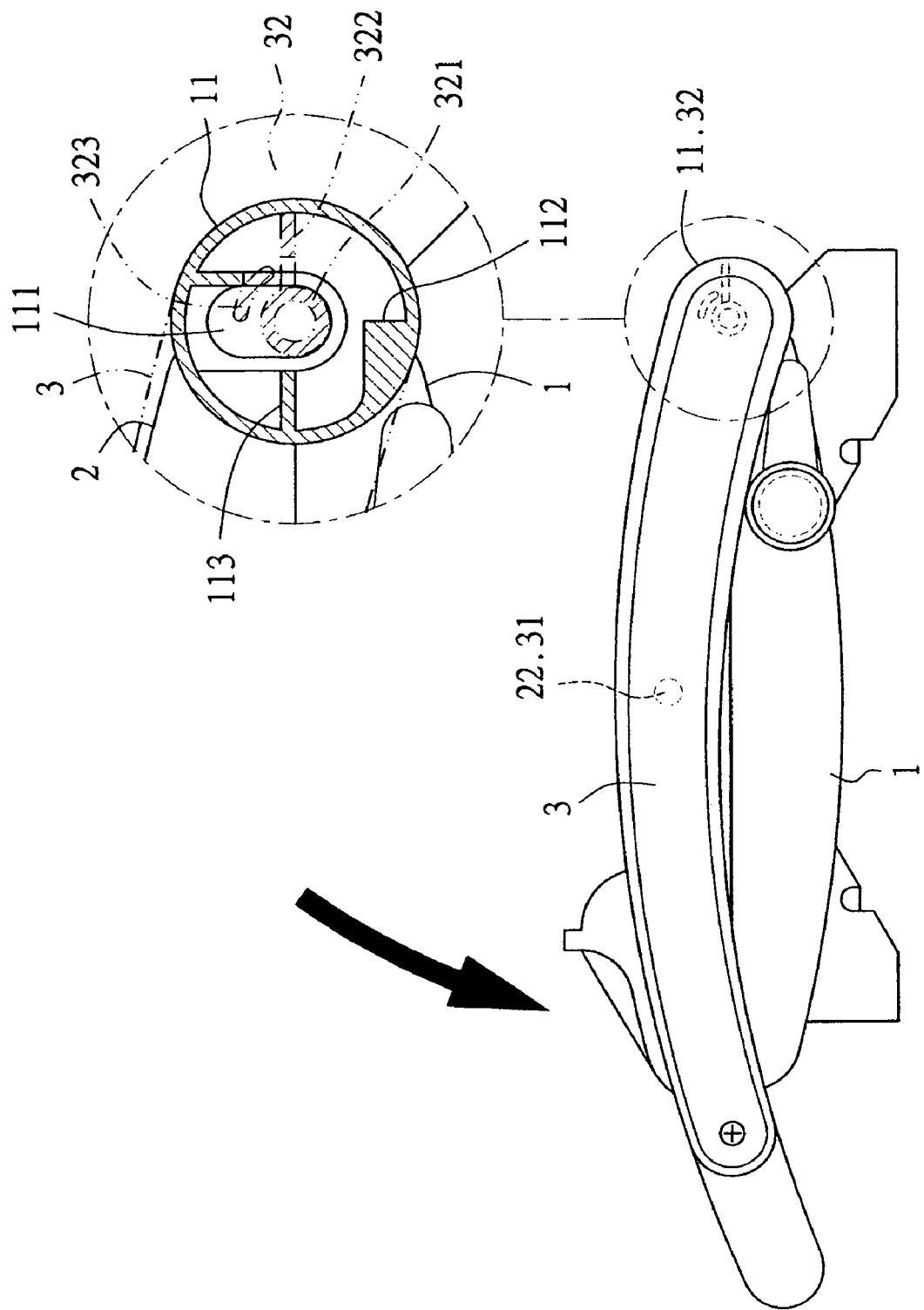
FIG. 3 is a side view of the assembled barbecue where thick foodstuffs being broiled therein in a closed position thereof according to another embodiment of the invention.

Referring to FIG. 3, for broiling thick foodstuffs (not shown), the handle 3 is pulled from the open position of the barbecue (see FIG. 2) to a closed position thereof as indicated by an arrow. At this position, both surfaces of foodstuffs can be uniformly heated by the cooking plates 1 and 2.

Figure 4A:
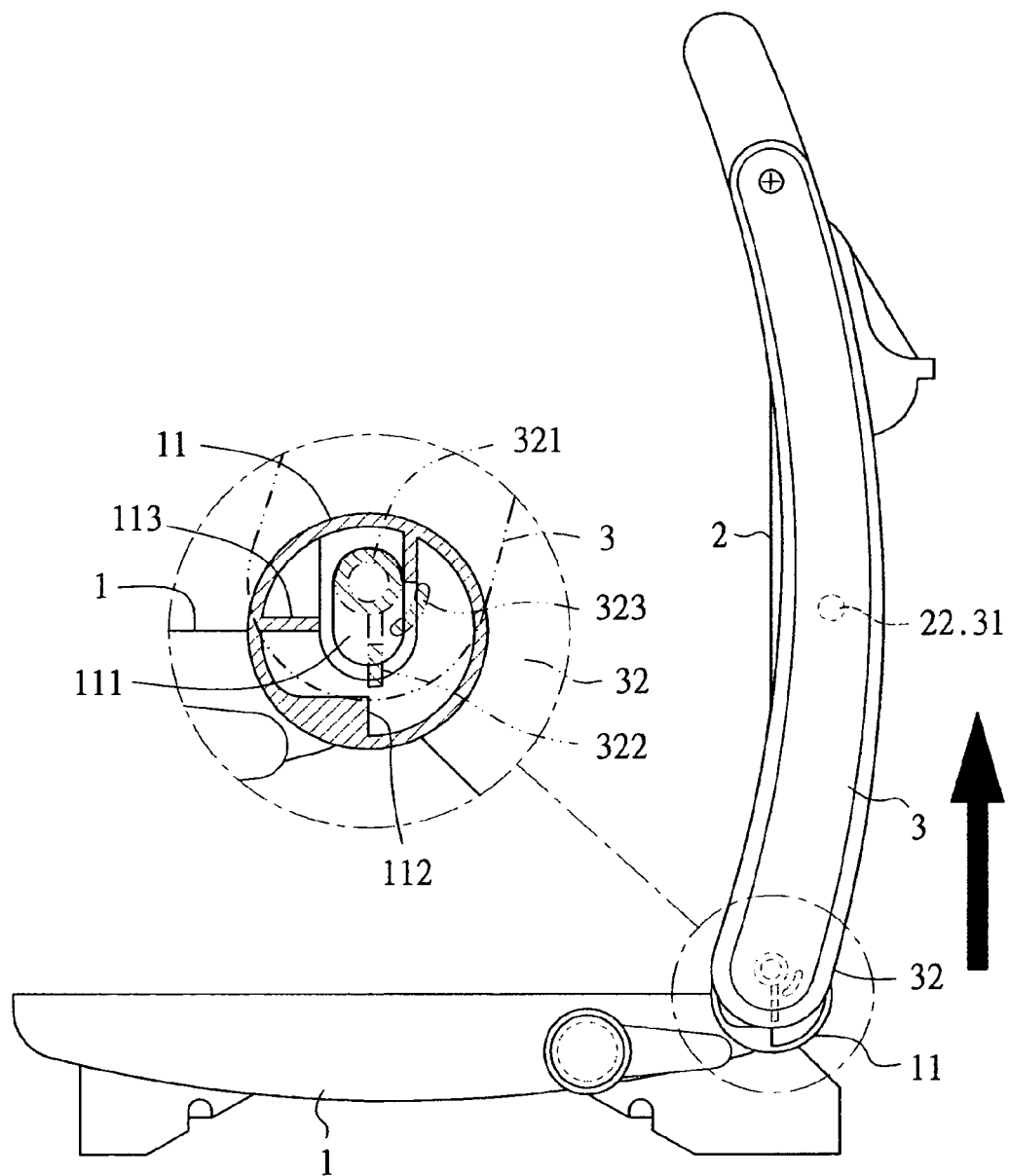
FIG. 4A is a side view of the assembled barbecue where the handle has lifted to its maximum and is substantially perpendicular to its base.
Figure 4B:
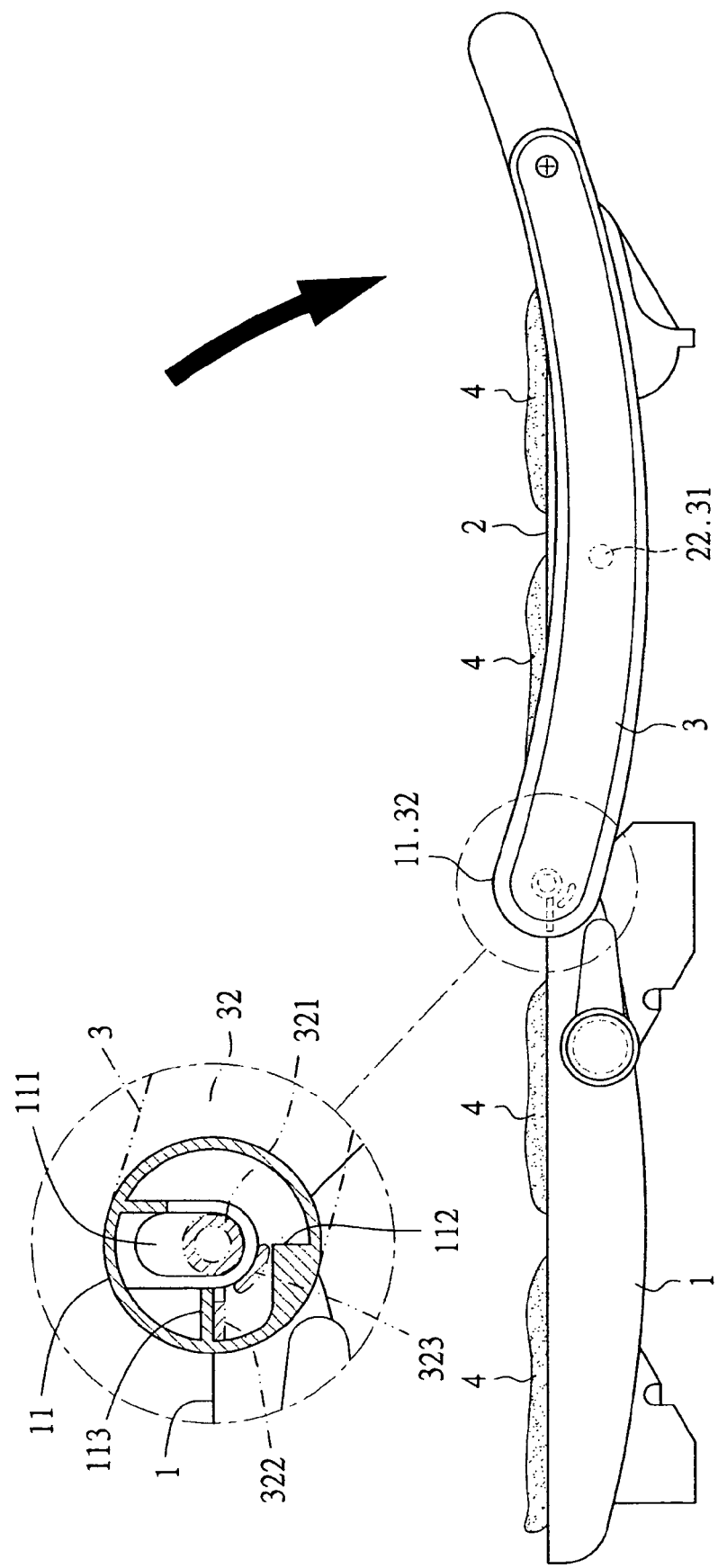
FIG. 4B is a side view of the assembled barbecue where the handle and the second cooking plate have pivoted to a position substantially flush with the base according to a further embodiment of the invention.

Referring to FIGS. 4A and 4B, for broiling a number of thin foodstuffs 4A, the handle 3 is lifted from the position shown in FIG. 2 to its maximum extent (see FIG. 4A). At this position, the projecting pin 321 is disposed at the other end of the cavity 111 and the stop member 322 clears the shoulder 112 temporarily. The second cooking plate 2 is thus made pivotal. Next, the second cooking plate 2 is pivoted about 90 degrees clockwise with respect to the first cooking plate 1 as indicated by the arrow in FIG. 4B. After pivoting, the second cooking plate 2 is substantially flush with the first cooking plate 1. At this position, the projecting pin 321 is disposed at one end of the cavity 111, also shown in FIGS. 2 and 3, the stop member 322 is stopped by the rib 113, and the barbecue is thus stable.

While the invention herein disclosed has been described by means of specific embodiments, numerous modifications and variations could be made thereto by those skilled in the art without departing from the scope and spirit of the invention set forth in the claims.

What is claimed is:

1. A barbeque comprising:
   a first cooking plate comprising two hinge joints, with the first cooking plate having a rear side with two ends, with each of the two hinge joints disposed at a corresponding one of the two ends, with each of the two hinge joints made of a hollow cylinder, with the hollow cylinder having an outer surface and an inner wall, with an elliptical cavity attached to and extending from the inner wall, with a shoulder on the inner wall and generally opposite the elliptical cavity, and with a rib projecting inwardly from the inner wall spaced from the shoulder and abutting the elliptical cavity;
   a second cooking plate comprising two arc rabbets, with each of the two arc rabbets corresponding to one of the the two hinge joints of the first cooking plate, and with each of the two arc rabbets fit onto the outer surface of a corresponding one of the two hinge joints and slideable thereon; and
   a substantially inverted U-shaped handle with two ends, each of the two ends of the handle comprising a rotation portion, each of the two ends of the handle pivotally secured to a corresponding one of the two ends of the first cooking plate, with each rotation portion including a projecting pin and a stop member, with the projecting pin connected and parallel to the stop member, with the projecting pin inserted into the corresponding elliptical cavity, and with the projecting pin disposed at one end of the corresponding elliptical cavity and being lengthwise slideable therein;
   wherein the second cooking plate is pivotal between a first position, a second position and a third position, with the second cooking plate generally parallel to the first cooking plate in the first position, with the second cooking plate generally perpendicular to the first cooking plate in the second position and with the second cooking plate immediately adjacent and generally parallel to and flush with the first cooking plate in the third position, with the third position generally 180 degrees from the first position, and with the first plate and second plate being stable in the first position, the second position and the third position by cooperation of the shoulder and the rib of the each of the two hinge joints with the corresponding projecting pin and the corresponding stop member of the corresponding one of the two rotation portions for broiling different thicknesses of foodstuffs or different numbers of foodstuffs.

\* \* \* \* \*